(12) United States Patent
Sokou et al.

(10) Patent No.: US 9,114,785 B2
(45) Date of Patent: Aug. 25, 2015

(54) BRAKE SYSTEM WITH MASTER CYLINDER, DISENGAGED FROM THE BRAKE PEDAL, AND HYDRAULIC BRAKE BOOSTER

(75) Inventors: Komi Sokou, Saint-Ouen (FR); Roman Winkler, Asnières sur Seine (FR); Bastien Cagnac, Cramoisy (FR); Chris Anderson, Paris (FR); Raynald Sprocq, Esbly (FR)

(73) Assignee: Robert Bosch GmbH, Stuttgart (DE)

( * ) Notice: Subject to any disclaimer, the term of this patent is extended or adjusted under 35 U.S.C. 154(b) by 929 days.

(21) Appl. No.: 13/376,325

(22) PCT Filed: May 28, 2010

(86) PCT No.: PCT/EP2010/057420
§ 371 (c)(1),
(2), (4) Date: Feb. 21, 2012

(87) PCT Pub. No.: WO2010/139626
PCT Pub. Date: Dec. 9, 2010

(65) Prior Publication Data
US 2012/0137674 A1 Jun. 7, 2012

(30) Foreign Application Priority Data
Jun. 5, 2009 (FR) ...................................... 09 02749

(51) Int. Cl.
| | |
|---|---|
| *B60T 13/14* | (2006.01) |
| *B60T 7/04* | (2006.01) |
| *B60T 8/40* | (2006.01) |
| *B60T 8/44* | (2006.01) |

(52) U.S. Cl.
CPC .............. *B60T 7/042* (2013.01); *B60T 8/4077* (2013.01); *B60T 8/441* (2013.01); *B60T 13/145* (2013.01)

(58) Field of Classification Search
CPC .............................. B60T 13/145; B60T 13/686
USPC .................... 60/545, 550, 555, 582, 591, 593
See application file for complete search history.

(56) References Cited

U.S. PATENT DOCUMENTS

| | | | | |
|---|---|---|---|---|
| 5,836,659 | A | * 11/1998 | Feigel et al. ............... | 303/113.4 |
| 2003/0090149 | A1 | 5/2003 | Kusano et al. | |
| 2006/0158026 | A1 | 7/2006 | Aoki et al. | |
| 2009/0095100 | A1* | 4/2009 | Toyohira et al. ................ | 74/110 |

OTHER PUBLICATIONS

PCT/EP2010/057420 International Search Report dated Aug. 4, 2010 (2 pages).

* cited by examiner

*Primary Examiner* — F. Daniel Lopez
(74) *Attorney, Agent, or Firm* — Michael Best & Friedrich LLP

(57) ABSTRACT

Braking system with master cylinder (100), decoupled from the brake pedal and hydraulic brake booster (200), comprising
a boost chamber (206) in which the rear of the piston (110) of the master cylinder (100) is inserted, supplied in a controlled manner by a high-pressure unit (300), supplying brake fluid under high pressure on command to the boost chamber in order to act on the piston (110) of the master cylinder (100), and
an actuator chamber (209) receiving an actuator piston (220) connected to the control rod (230) of the brake pedal.

A controlled hydraulic link (320, 321) connects the boost chamber (206) and the actuator chamber (209) and a further controlled hydraulic link (310, 311) connects the actuator chamber (209) to the chamber of a brake simulator (270).

17 Claims, 4 Drawing Sheets

BRAKE SYSTEM WITH MASTER CYLINDER, DISENGAGED FROM THE BRAKE PEDAL, AND HYDRAULIC BRAKE BOOSTER

BACKGROUND OF THE INVENTION

The present invention relates to a braking system with master cylinder, decoupled from the brake pedal and hydraulic brake booster, comprising
- a boost chamber into which the rear of the piston of the master cylinder is inserted, supplied in a controlled manner by a high pressure unit, supplying brake fluid under high pressure on command to the boost chamber in order to act on the piston of the master cylinder,
- an actuator chamber receiving an actuator piston connected to the control rod of the brake pedal,
- a controlled hydraulic link between the boost chamber and the actuator chamber.

Numerous braking systems exist with a hydraulic brake booster arranged in series with the master cylinder. However, said known systems generally have the drawback of being relatively bulky and their design complex, as disclosed in the patent application US 2006/0158026 A1.

SUMMARY OF THE INVENTION

The object of the present invention is to develop a braking system with a hydraulic brake booster decoupled from the brake pedal and permitting emergency operation to be provided in the event of malfunction of the high pressure unit supplying the boost chamber of the hydraulic brake booster.

To this end, the present invention relates to a braking system with master cylinder, decoupled from the brake pedal and hydraulic brake booster, comprising
- a boost chamber into which the rear of the piston of the master cylinder is inserted, supplied in a controlled manner by a high pressure unit, supplying brake fluid under high pressure on command to the boost chamber in order to act on the piston of the master cylinder,
- an actuator chamber receiving an actuator piston connected to the control rod of the brake pedal,
- a controlled hydraulic link between the boost chamber and the actuator chamber.

Said braking system has the advantage of a particularly simple design and of being composed of a smaller number of elements which translates into a significant advantage from the point of view of manufacturing cost. The bulk is reduced which is a very great advantage in terms of the integration of said braking system in the engine compartment of a vehicle.

According to one advantageous feature, the braking system comprises a brake booster formed by a simulator chamber defined by a piston pushed back by at least one spring, said chamber communicating with the actuator chamber by a controlled hydraulic link.

According to a further advantageous feature, the piston of the master cylinder carries a push rod fixed in movement to the piston and protruding into the actuator chamber while remaining at a fixed distance from the actuator piston in normal operation, but to be pushed by the actuator piston in the event of malfunction of the high pressure unit after a specific quantity of fluid is forced back from the actuator chamber.

Thus, the braking system according to the invention makes it possible to pressurize the master cylinder, in particular a tandem master cylinder which is decoupled from the brake pedal. Said pressurization does not require an additional piston for the hydraulic brake booster. The pressurization may be controlled by the brake pedal but also automatically by a control system such as ABS, ARS systems without intervention by the driver and without the driver noticing it by a reaction on the brake pedal. In the event of malfunction of the high pressure unit, it is possible to provide emergency operation, firstly by placing the actuator chamber in communication with the boost chamber to force fluid from the actuator chamber back to the boost chamber as a function of the thrust exerted on the brake pedal and the control rod.

In addition, a second level of emergency operation is provided in a mechanical manner: in the event of a leakage from the hydraulic circuit in the region of the brake booster and the master cylinder, the actuator piston is able to push directly the push rod associated with the master cylinder which is the primary piston in the case of a tandem master cylinder.

In the event of first-level hydraulic emergency assistance, the force exerted by the driver on the brake pedal is boosted and, as a function of the relationship of the active sections of the actuating piston and the piston of the master cylinder, this boosting effect is produced by steady force on the brake pedal, without dead travel, since only the actuator chamber is filled with fluid.

The second emergency action by mechanical transmission is carried out where the dead travel is equal to the decoupling clearance, i.e. the interval which normally exists between the front of the actuator piston and the rear of the push rod.

According to a further advantageous feature, the brake booster comprises a body having a first bore on the master cylinder side, followed by a second bore and a third bore, the first bore defining with the master cylinder the boost chamber and the second bore receiving the actuator piston guided in the third bore.

According to a further feature, the boost chamber is separated from the actuator chamber by a separating disc provided with a hub forming the bearing of the push rod passing through the separating disc in a sealed manner.

According to a further feature, the actuator piston comprises, on the actuator chamber side, an annular housing surrounding a central cylinder, the annular housing receiving the end of a return spring which also bears against the separating disc around its hub, the central cylinder being designed to push the push rod in emergency operating conditions.

According to a further feature, the controlled hydraulic link comprises a solenoid valve which is normally closed but which is open in the event of malfunction of the high pressure unit, said link being opened, placing the actuator chamber and the boost chamber in hydraulic communication to transmit pressurized fluid from the actuator chamber to the boost chamber, by the action of the thrust of the actuator piston, the controlled hydraulic link between the actuator chamber and the simulator chamber being provided by a solenoid valve which is normally open, but closed in the event of malfunction of the high pressure unit to isolate the actuator chamber relative to the simulator.

Regarding the assembly, due to the structure of the tandem master cylinder to which the push rod is directly associated and the hydraulic brake booster structure with the separating disc, it is possible to produce the two sub-assemblies separately and to assemble them in very simple conditions.

BRIEF DESCRIPTION OF THE DRAWINGS

The present invention is disclosed hereinafter in a more detailed manner with reference to an embodiment of a hydraulic brake booster system and master cylinder shown in the accompanying drawings, in which.

DETAILED DESCRIPTION

Figure 1:
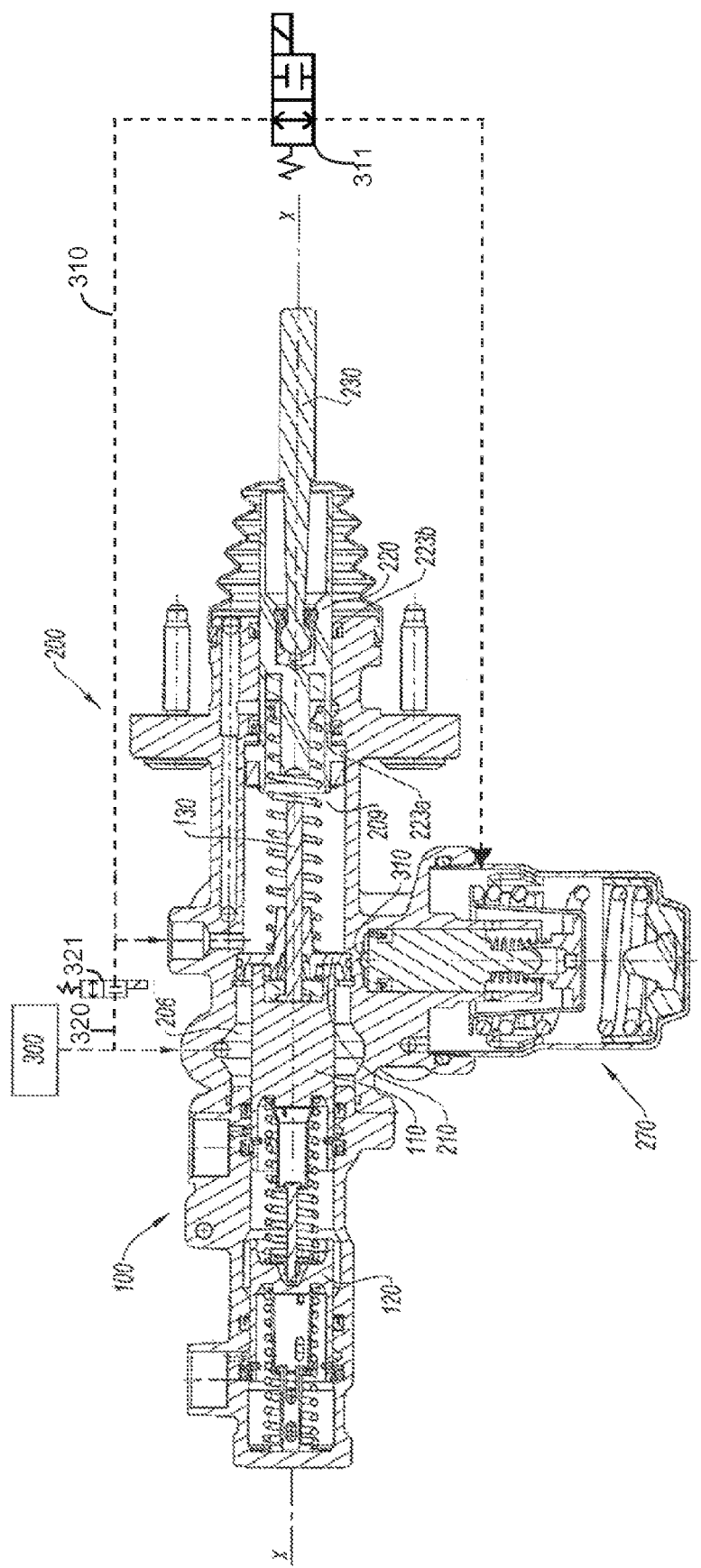
FIG. 1 is a sectional view of the braking system with master cylinder and hydraulic brake booster.

FIG. 1 shows a braking system comprising a master cylinder 100 combined with a hydraulic brake booster 200 according to the invention. In this case, the master cylinder 100 is a tandem master cylinder 100. In the conventional manner, the orientation of the braking system, for the purposes of the present description, is the traditional orientation, the master cylinder 100 being located to the left and the brake booster 200 to the right, such that the master cylinder is located at the front of the brake booster and the brake pedal to the rear of the brake booster.

Figure 2A:
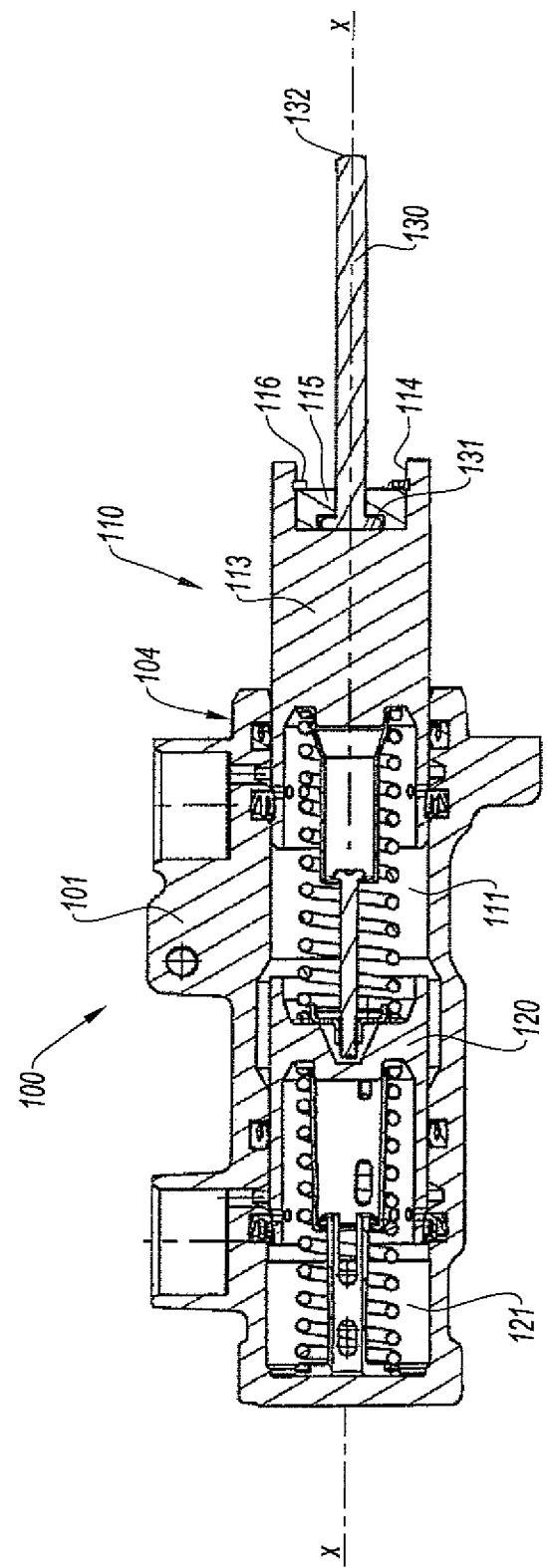
FIG. 2A is a sectional view of the tandem master cylinder of FIG. 1.

In more detail according to the sectional views of FIGS. 2A-2D, and in particular FIG. 2A, the tandem master cylinder 100 comprises a body 101 housing a primary piston 110 and a secondary piston 120, each defining a chamber 111, 121 supplied with brake fluid from a reservoir, not shown, via fluid links which are open when the pistons are in the neutral position, and not displaced, and which are closed as soon as the pistons are displaced to pressurize the brake fluid of the chambers and to supply it to the brake circuits C1, C2 via branch pipes, not shown.

Figures 2B, 2C, 2D:
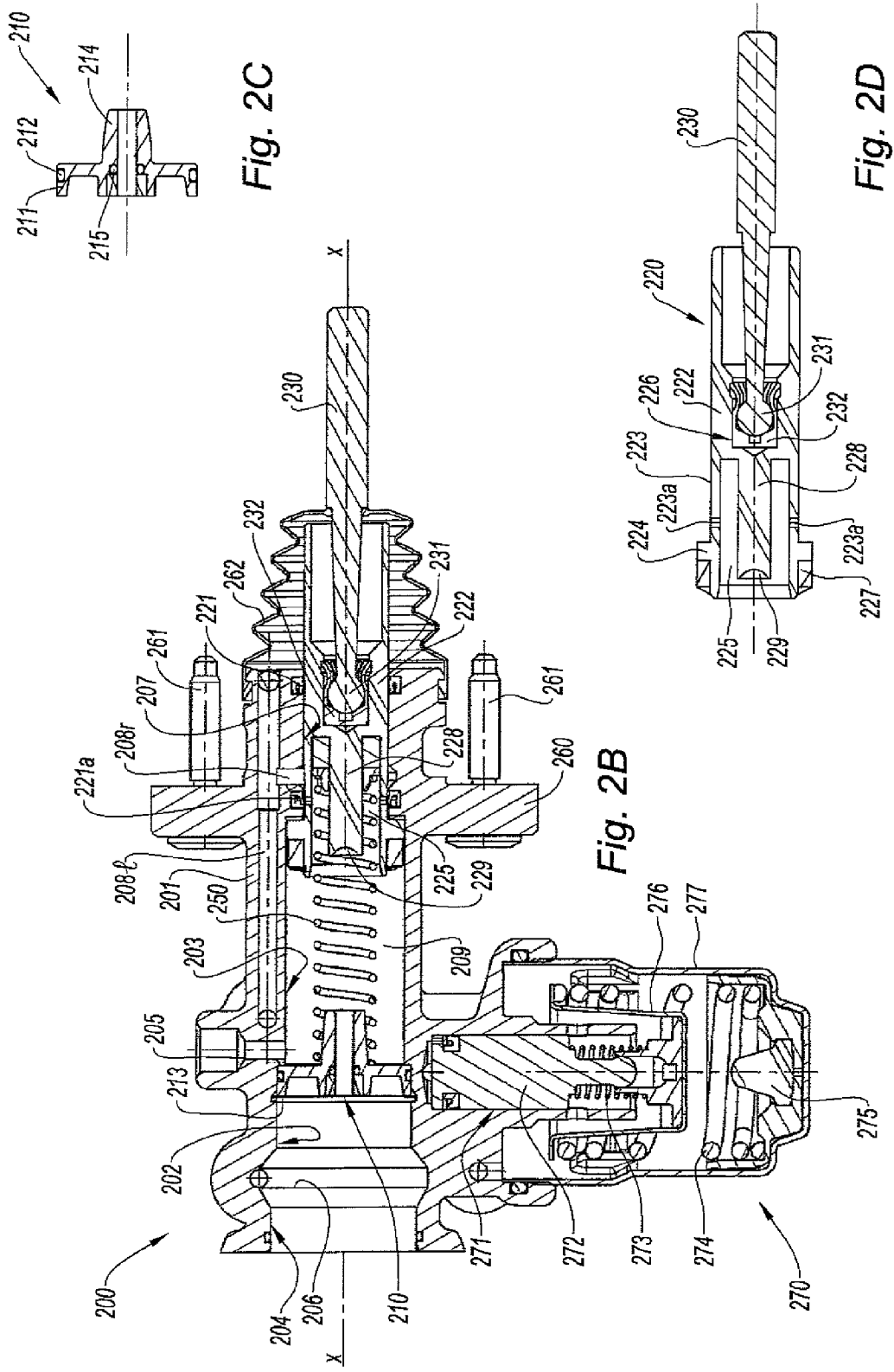
FIG. 2B is a sectional view of the hydraulic brake booster of FIG. 1.
FIG. 2C is a sectional view of the separating disc.
FIG. 2D is a sectional view of the actuator piston.

According to FIG. 2B, the hydraulic brake booster 200 consists of a body 201 with a first bore 202 and a second bore 203, aligned on the axis XX of the bore 102 of the tandem master cylinder 100. The section of the first bore 202 is greater than that of the second bore 203, forming therebetween a shoulder 205. The hydraulic brake booster 200 is connected to the tandem master cylinder 100 by the inlet 204 of its first bore 202 being fitted onto the end 104 of the body 101 of the tandem master cylinder, forming a mounting bearing, the assembly being maintained by connecting members, not shown.

The first bore 202 forms a boost chamber 206 closed by a separating disc 210 applied against the shoulder 205 and provided with a cylindrical collar 211 with a groove provided with a sealing gasket 212 for the wall of the boost chamber 206. The separating disc 210 is blocked by a resilient ring 213 clipped into a groove formed in the bore 202 in front of the edge of the cylindrical collar 211 of the disc 210.

The separating disc 210 according to FIG. 2C comprises a hub 214 forming a guide bearing along the axis XX.

According to FIGS. 1 and 2A, the primary piston 110 is inserted via its rear extension 113 into the boost chamber 206 and its rear face comprises a housing 114 in which is fixed the head 131 of a push rod 130 passing in a sealed manner through the bearing formed by the hub 214 of the separating disc 210 forming the base of the boost chamber 206. The head 131 is held against the base of the housing 114 by a washer 115 held in the housing by a resilient ring 116 which is clipped in.

The push rod 130 is designed to transmit directly the forces exerted on the brake pedal in emergency operating conditions, by being pushed by the actuator piston 220. To achieve this, the rod has dimensional features and is designed so as to permit such forces to be transmitted. However, its section is reduced to a minimum for the reasons provided below. Its diameter is, for example, in the order of 10 mm.

The hub 214 of the separating disc 210 is provided with a seal 215 on the boost chamber 206 side in which the push rod 130 passes.

According to FIGS. 1, 2B and 2D, behind the separating disc 210, the second bore 203 of the hydraulic brake booster houses an actuator piston 220 connected to the control rod 230 originating from the brake pedal. The actuator piston 220 is guided in a third bore 207 at the rear end of the body 201 of the hydraulic brake booster 200.

Said bore 207 communicates via a radial hole 208r and a longitudinal hole 208l with the brake fluid reservoir to supply the actuator chamber 209 defined by the actuator piston 220 in the second bore 203 behind the separating disc 210; the supply of brake fluid is provided in a similar manner to that of the chambers 111, 121 of the tandem master cylinder 100 between two peripheral seals 221a, b (cups) housed in the grooves of the third bore 207.

According to FIG. 2D, the actuator piston 220 has a central part 222 (or hub) bounded by an elongated cylindrical skirt 223, making it possible to ensure the supply of the actuator chamber 209 when the actuator piston 220 is in the neutral position and to stop this communication with the brake fluid reservoir as soon as the piston 220 is displaced by the control rod 230. On the outside and slightly set back from the front edge, the skirt 223 carries a ring 224 completing the section of the piston and adapting it to that of the actuator chamber 209. The ring 224 is guided in this chamber and comprises a guide seal 227 mounted about the cylinder in front of the ring.

The central part 222 at the front of the actuator piston forms an annular housing 225 surrounding a central cylinder 228 in the axis XX; the central cylinder 228 is terminated at the front by a rounded cavity 229 opposite the rear rounded end 132 of the push rod 130. The annular housing 225 receives a return spring 250 surrounding the push rod 130 and the hub 214 forming the guide bearing of the push rod 130 in the separating disc 210.

The rear side of the actuator piston 220 comprises a cylindrical cavity 226 in which a tulip-shaped cup 232 is housed covering the head 231 in the manner of a ball joint of the control rod 230.

The rear of the body 201 of the hydraulic brake booster 200 is provided with a fixing flange 260 to install the brake booster and the tandem master cylinder, which it carries, against the dashboard separating the engine housing and the interior of the vehicle.

The body 201 of the hydraulic brake booster 200 comprises, in projection, a brake simulator 270 formed by a cylinder 271 in which a piston 272 slides, cooperating with return springs 273, 274 operating in series and a resilient end of travel stop 275, to simulate the reaction of the brake circuits in response to the action on the brake pedal.

In more detail, the first spring 273 bears against the piston 272 and a cup 276 which in turn is pressed against the second spring 274. Said second spring bears against the base of a cap 277 fixed to the body 201 of the hydraulic brake booster and comprising the resilient stop 275 for the cup 276.

Thus, according to the degree to which the brake pedal is pushed down and the displacement which results therefrom of the control rod 230 and the actuator piston 220, the piston 272 of the simulator is firstly subjected to the counteraction of the first spring 273; then, when the piston 272 bears directly against the cup 276 of said first spring, it has to push back the second spring 274 and finally, via the cup of the spring it is able to bear against the stop 275. This stop is itself resilient but opposes high resistance.

The springs of the simulator have a hardness which, by the combination thereof, simulate the increase in the reaction of a braking system.

The different parts of the hydraulic brake booster and the tandem master cylinder communicate by hydraulic links, as disclosed below according to FIG. 1.

The boost chamber 206 is connected to a high pressure unit 300 which supplies, on command, the pressurized fluid acting on the section of the primary piston 110 in the boost chamber.

The actuator chamber 203 is supplied with brake fluid by its communication with the reservoir connected by holes 208r, 208l which open into the bore 207 receiving the skirt 223 of the actuator piston 220. The fluid is thus able to enter the actuator chamber 209 through the orifices 223a of the skirt 223 and the annular housing 225 when the skirt and the orifices are not displaced beyond the first cup 221a; i.e. when the actuator piston 220 is in a neutral position.

The actuator chamber 209 is connected to the simulator 270 via a conduit 310 controlled by a valve 311. Said link 310 is normally open so that the fluid compressed in the actuator chamber 209 by the actuator piston 220 is forced back into the chamber 271 of the simulator 270 against the action of the springs 273, 274 bearing against the piston 272 of the simulator; this action creates a reaction transmitted to the actuator piston 220 by the fluid captured in the volume defined by the simulator chamber 271 and the actuator chamber 209; the control rod 230 transmits this reaction to the brake pedal providing the driver with the sensation of a reaction of the brakes.

The actuator chamber 209 is also connected to the boost chamber 206 by a fluid link 320, controlled by a valve 321. This link 320 is normally closed; but it is open in the event of malfunction of the high pressure unit.

The valves 311, 321 are solenoid valves, such as sliding gate valves. The valve 311 is kept open during normal operation of the brake booster and is closed by its return spring in the event of the current being disconnected, the disconnection of current corresponding to abnormal operation or emergency operation.

The operation is reversed for the valve 321: this valve is kept closed during normal operation and is opened automatically in emergency operation as a result of its power supply being disconnected, the opening being provided by the return spring.

The structure and composition of the master cylinder 100 and the brake booster 200 with its simulator permit a particularly advantageous mounting of the assembly.

Thus, FIGS. 2A and 2B each show separately the two sub-assemblies forming the master cylinder system with hydraulic brake booster, before their assembly.

Thus, the sub-assembly of the tandem master cylinder 100 comprises the body 101 with the shoulder 104 designed to receive the body 201 of the hydraulic brake booster 200 and the rear extension 113 of the primary piston provided with the push rod 130, fixed permanently.

FIG. 2B shows the sub-assembly formed by the brake booster 200 before its assembly. It consists of the body 201 provided with the simulator 270. The actuator piston 220 has been introduced into the third bore 207 of the body 201, passing through its front opening 204, then the return spring 250 has been put in place and the separating disc 210 which is locked in position by the resilient ring 213 clipped into the groove of the first bore 202.

In this version, the control rod 230 is already assembled on the actuator piston 220. This operation may also be carried out after mounting the brake booster 200 onto the master cylinder 100. Then, the bellows 262 is put in place protecting the rear end of the brake booster.

Figure 3A:
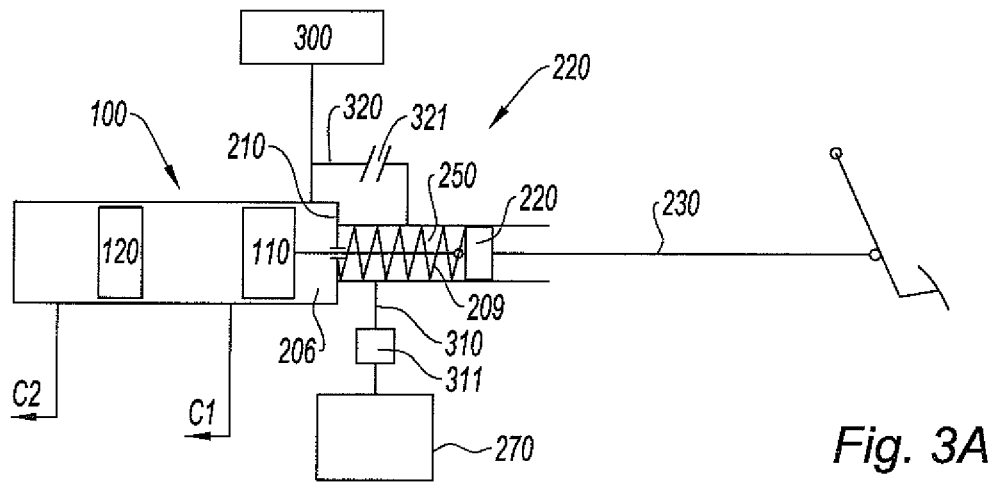
FIG. 3A is a schematic view of the braking system according to FIG. 1 in normal operation.
Figure 3B:
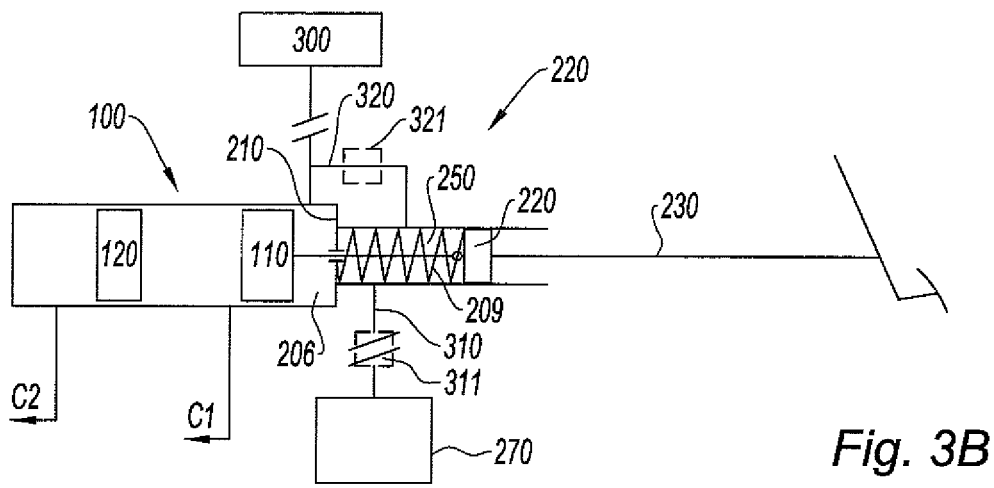
FIG. 3B is a schematic view similar to that of FIG. 3A for the braking system in first-level emergency operation.
Figure 3C:
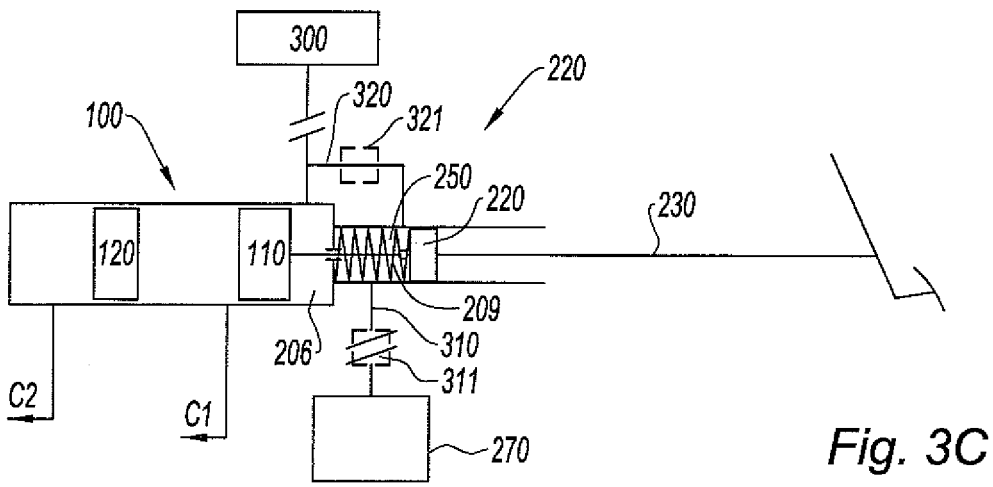
FIG. 3C is a schematic view similar to that of FIG. 3B of the braking system in second-level emergency operation.

The operation of the master cylinder with brake booster will be disclosed in more detail with reference to the diagrams of FIGS. 3A to 3C.

FIG. 3A shows schematically the hydraulic brake booster and the tandem master cylinder and the controlled hydraulic links.

In normal conditions of operation of the hydraulic brake booster, the movement of the control rod 230 pushed by the brake pedal is detected which makes it possible to control the high pressure unit 300 which supplies brake fluid under high pressure to the boost chamber 206 in a suitable manner; said pressure acts on the primary piston 110 which in turn acts on the secondary piston 120 by means of the primary chamber 111, so as to supply pressurized brake fluid to the brake circuits C1, C2. During this operation, the actuator chamber 209, filled with brake fluid, is in communication with the simulator 270, its link with the boost chamber being closed, i.e. disconnected. Thus there is a constant fluid volume in the actuator chamber and the chamber of the simulator to transmit the simulated reaction of the brakes.

The volume of the actuator chamber 209 and the simulator chamber 271 is constant, apart from the variation in volume which is associated with the push rod moving forward in the separating disc 210. As the section of the rod is reduced to the minimum required for direct transmission of forces during second-level emergency operation (see below), this variation in volume will not interfere with the simulation of the reaction by the simulator 270.

It is also noteworthy that, in normal operating conditions, the actuator piston 220 is not in contact with the push rod 130, an interval being maintained by the forward movement of the primary piston 110, controlled by means of the pressurized fluid supplied by the high pressure generator 300 into the boost chamber 206 according to the detected forward movement of the actuator piston 220. This forward movement is detected, for example, in the region of the control rod 230 by conventional means, not shown.

FIG. 3B shows a first-level emergency operation. The high pressure unit 300 is assumed to be malfunctioning and not able to supply pressurized fluid to the boost chamber 206.

The malfunction of the high pressure unit 300 automatically causes the opening of the hydraulic link 320 connecting the actuator chamber 209 to the boost chamber 206. This communication makes it possible to force back the pressurized fluid from the actuator chamber 209 to the boost chamber 206 according to the force exerted by the driver on the brake pedal and which is transmitted for the control rod 230 to the actuator piston 220.

According to an embodiment of the invention, at the same time that the hydraulic link 310 opens, establishing the communication of fluid between the actuator chamber 209 and the boost chamber 206, the link 310 from the actuator chamber 209 to the simulator 270 is disconnected such that the actuator piston 220 forces back all the fluid into the boost chamber 206 and the action exerted on the brake pedal as a whole acts on the primary piston 110 without part of this energy being absorbed by the operation of the simulator 270; this is all the more advantageous as the simulator 270 is now unnecessary since the reaction of the braking system is directly transmitted to the actuator piston 220 and thus to the brake pedal.

The degree of boosting of the action depends on the relationship of the sections of the actuator piston 220 and the primary piston 110, the section of the piston 220 being that of the skirt 223 and not that of the collar 224 which is only used for guiding the piston 220.

FIG. 3C shows the second level of emergency operation of the braking system according to the invention.

It is assumed that, as a result of leakages, the forcing back of brake fluid compressed by the actuator piston 220 is no longer sufficient to push back the primary piston 110 with the result that the actuator piston 220 bears against the push rod 130 of the primary piston 110.

Based on this contact, the force applied by the brake pedal and the control rod 230 onto the actuator piston 220 is transmitted mechanically to the push rod 130, i.e. to the primary piston 110 which controls the emergency brake.

The present invention relates to the field of braking systems for automobiles and the brake equipment industry.

LIST OF REFERENCE NUMERALS 100 tandem master cylinder
101 body of tandem master cylinder
110 primary piston
111 primary piston chamber
113 extension of primary piston
114 housing
115 washer
116 resilient ring
120 secondary piston
121 secondary piston chamber
130 push rod
131 head of push rod
200 hydraulic brake booster
201 body of brake booster
202 first bore
203 second bore
204 inlet of first bore
205 shoulder
206 boost chamber
207 third bore
208r radial hole
208l longitudinal hole
209 actuator chamber
210 separating disc
211 cylindrical collar
212 sealing gasket
213 resilient ring
214 hub
215 seal
220 actuator piston
221 cup (seal)
222 hub/central part
223 skirt
223a orifices of skirt
224 ring
225 annular housing
226 cylindrical cavity
227 guide seal
228 central cylinder
229 cavity
230 control rod
231 head of rod
232 tulip-shaped cup
250 return spring
260 flange
261 tie rod
262 bellows
270 simulator
271 cylinder/simulator chamber
272 piston
273 return spring
274 return spring
275 stop
276 cup
277 cap
300 high pressure unit
310 hydraulic link
311 valve
320 hydraulic link
321 valve
C1, C2 braking circuits

The invention claimed is:

1. A braking system with a master cylinder, decoupled from a brake pedal and a hydraulic brake booster, comprising
a boost chamber (206) in which a rear of a piston (110) of the master cylinder (100) is inserted, supplied in a controlled manner by a high pressure unit (300), the high pressure unit (300) supplying brake fluid under high pressure on command to the boost chamber in order to act on the piston (110) of the master cylinder (100),
an actuator chamber (209) receiving an actuator piston (220) connected to a control rod (230) of the brake pedal,
a hydraulic link (320) controlled by a valve (321) between the boost chamber (206) and the actuator chamber (209), characterized in that
the hydraulic link (320) controlled by the valve (321) comprises a solenoid valve (321) which is kept closed during normal operation but is opened in the event of malfunction of the high pressure unit (300), said link being opened, placing in hydraulic communication the actuator chamber (209) and the boost chamber (206) to transmit pressurized fluid from the actuator chamber to the boost chamber under the action of thrust of the actuator piston (220), and
a controlled hydraulic link (310, 311) between the actuator chamber (209) and a simulator chamber (271) is provided with a solenoid valve (311) which is kept open during normal operation, but is closed in the event of malfunction of the high pressure unit (300) to isolate the actuator chamber (209) relative to a simulator (270); and
in that the actuator piston (220) comprises, on an actuator chamber (209) side, an annular housing surrounding a central cylinder (228), the annular housing receiving an end of a return spring (250) which also bears against a separating disc (210) around a hub (214), the central cylinder (228) being designed to push a push rod (130) in emergency operating conditions.

2. The braking system with hydraulic brake booster according to claim 1, characterized in that the simulator (270) is formed by the simulator chamber (271) defined by a piston (272) pushed back by at least one spring (273, 274).

3. The braking system with hydraulic brake booster according to claim 1, characterized in that a diameter of the actuator piston (220) is less than a diameter of the piston (110) of the master cylinder in the boost chamber (206).

4. The braking system with hydraulic brake booster according to claim 1, characterized in that the piston (110) of the master cylinder (100) carries a push rod (130) fixed in movement to the piston (110) and protruding into the actuator chamber (220) while remaining at a fixed distance from the actuator piston (220) in normal operation, but to be pushed by the actuator piston in the event of malfunction of the high pressure unit (300) after a specific quantity of fluid is forced back from the actuator chamber (220).

5. The braking system with hydraulic brake booster according to claim 1, characterized in that the brake booster comprises a body (201) having a first bore (202) on a master cylinder (100) side, followed by a second bore (203) and a third bore (207), the first bore defining with the master cylinder (100) the boost chamber (206) and the second bore (203) receiving the actuator piston (220) guided in the third bore (207).

6. The braking system with hydraulic brake booster according to claim 5, characterized in that the boost chamber (206) is separated from the actuator chamber (209) by the separating disc (210) provided with the hub (214) forming a bearing of the push rod (130) passing through the separating disc (210) in a sealed manner.

7. A braking system with a master cylinder, decoupled from a brake pedal and a hydraulic brake booster, comprising
a boost chamber (206) in which a rear of a piston (110) of the master cylinder (100) is inserted, supplied in a controlled manner by a high pressure unit (300), the high pressure unit (300) supplying brake fluid under high pressure on command to the boost chamber in order to act on the piston (110) of the master cylinder (100),
an actuator chamber (209) receiving an actuator piston (220) connected to a control rod (230) of the brake pedal,
a hydraulic link (320) controlled by a valve (321) between the boost chamber (206) and the actuator chamber (209), characterized in that
the hydraulic link (320) controlled by the valve (321) comprises a solenoid valve (321) which is kept closed during normal operation but is opened in the event of malfunction of the high pressure unit (300), said link being opened, placing in hydraulic communication the actuator chamber (209) and the boost chamber (206) to transmit pressurized fluid from the actuator chamber to the boost chamber under the action of thrust of the actuator piston (220), and
a controlled hydraulic link (310, 311) between the actuator chamber (209) and a simulator chamber (271) is provided with a solenoid valve (311) which is kept open during normal operation, but is closed in the event of malfunction of the high pressure unit (300) to isolate the actuator chamber (209) relative to a simulator (270);
characterized in that the piston (110) of the master cylinder (100) carries a push rod (130) fixed in movement to the piston (110) and protruding into the actuator chamber (220) while remaining at a fixed distance from the actuator piston (220) in normal operation, but to be pushed by the actuator piston in the event of malfunction of the high pressure unit (300) after a specific quantity of fluid is forced back from the actuator chamber (220).

8. The braking system with hydraulic brake booster according to claim 7, characterized in that the simulator (270) is formed by the simulator chamber (271) defined by a piston (272) pushed back by at least one spring (273, 274).

9. The braking system with hydraulic brake booster according to claim 7, characterized in that a diameter of the actuator piston (220) is less than a diameter of the piston (110) of the master cylinder in the boost chamber (206).

10. The braking system with hydraulic brake booster according to claim 7, characterized in that the brake booster comprises a body (201) having a first bore (202) on a master cylinder (100) side, followed by a second bore (203) and a third bore (207), the first bore defining with the master cylinder (100) the boost chamber (206) and the second bore (203) receiving the actuator piston (220) guided in the third bore (207).

11. The braking system with hydraulic brake booster according to claim 10, characterized in that the boost chamber (206) is separated from the actuator chamber (209) by a separating disc (210) provided with a hub (214) forming a bearing of the push rod (130) passing through the separating disc (210) in a sealed manner.

12. The braking system with hydraulic brake booster according to claim 7, characterized in that the actuator piston (220) comprises, on an actuator chamber (209) side, an annular housing surrounding a central cylinder (228), the annular housing receiving an end of a return spring (250) which also bears against a separating disc (210) around a hub (214), the central cylinder (228) being designed to push the push rod (130) in emergency operating conditions.

13. A braking system with a master cylinder, decoupled from a brake pedal and a hydraulic brake booster, comprising
a boost chamber (206) in which a rear of a piston (110) of the master cylinder (100) is inserted, supplied in a controlled manner by a high pressure unit (300), the high pressure unit (300) supplying brake fluid under high pressure on command to the boost chamber in order to act on the piston (110) of the master cylinder (100),
an actuator chamber (209) receiving an actuator piston (220) connected to a control rod (230) of the brake pedal,
a hydraulic link (320) controlled by a valve (321) between the boost chamber (206) and the actuator chamber (209), characterized in that
the hydraulic link (320) controlled by the valve (321) comprises a solenoid valve (321) which is kept closed during normal operation but is opened in the event of malfunction of the high pressure unit (300), said link being opened, placing in hydraulic communication the actuator chamber (209) and the boost chamber (206) to transmit pressurized fluid from the actuator chamber to the boost chamber under the action of thrust of the actuator piston (220), and
a controlled hydraulic link (310, 311) between the actuator chamber (209) and a simulator chamber (271) is provided with a solenoid valve (311) which is kept open during normal operation, but is closed in the event of malfunction of the high pressure unit (300) to isolate the actuator chamber (209) relative to a simulator (270);
characterized in that the brake booster comprises a body (201) having a first bore (202) on a master cylinder (100) side, followed by a second bore (203) and a third bore (207), the first bore defining with the master cylinder (100) the boost chamber (206) and the second bore (203) receiving the actuator piston (220) guided in the third bore (207).

14. The braking system with hydraulic brake booster according to claim 13, characterized in that the boost chamber (206) is separated from the actuator chamber (209) by a separating disc (210) provided with a hub (214) forming a bearing of a push rod (130) passing through the separating disc (210) in a sealed manner.

15. The braking system with hydraulic brake booster according to claim 13, characterized in that the simulator (270) is formed by the simulator chamber (271) defined by a piston (272) pushed back by at least one spring (273, 274).

16. The braking system with hydraulic brake booster according to claim 13, characterized in that a diameter of the actuator piston (220) is less than a diameter of the piston (110) of the master cylinder in the boost chamber (206).

17. The braking system with hydraulic brake booster according to claim 13, characterized in that the actuator piston (220) comprises, on an actuator chamber (209) side, an annular housing surrounding a central cylinder (228), the annular housing receiving an end of a return spring (250) which also bears against a separating disc (210) around a hub (214), the central cylinder (228) being designed to push a push rod (130) in emergency operating conditions.

* * * * *